(12) United States Patent
Jones

(10) Patent No.: US 11,298,916 B2
(45) Date of Patent: Apr. 12, 2022

(54) PATCHES FOR OUTDOOR PRODUCTS AND METHOD OF MANUFACTURE

(71) Applicant: NOSO, LLC, Jackson, WY (US)

(72) Inventor: Kelli Marie Jones, Jackson, WY (US)

(73) Assignee: NOSO, LLC, Jackson Hole, WY (US)

( * ) Notice: Subject to any disclaimer, the term of this patent is extended or adjusted under 35 U.S.C. 154(b) by 89 days.

(21) Appl. No.: 15/920,452

(22) Filed: Mar. 14, 2018

(65) Prior Publication Data

US 2018/0264781 A1 Sep. 20, 2018

Related U.S. Application Data

(60) Provisional application No. 62/471,044, filed on Mar. 14, 2017.

(51) Int. Cl.
| | |
|---|---|
| *B32B 7/12* | (2006.01) |
| *B32B 7/06* | (2019.01) |
| *B32B 38/00* | (2006.01) |
| *B32B 3/26* | (2006.01) |
| *B32B 5/02* | (2006.01) |

(Continued)

(52) U.S. Cl.
CPC ............. *B32B 7/12* (2013.01); *B32B 3/263* (2013.01); *B32B 5/02* (2013.01); *B32B 7/06* (2013.01); *B32B 27/12* (2013.01); *B32B 37/10* (2013.01); *B32B 37/12* (2013.01); *C09J 7/21* (2018.01); *B32B 37/203* (2013.01); *B32B 38/0004* (2013.01); *B32B 38/145* (2013.01); *B32B 2037/1253* (2013.01); *B32B 2255/02* (2013.01); *B32B 2262/0261* (2013.01); *B32B 2305/18* (2013.01); *B32B 2305/72* (2013.01); *B32B 2307/31* (2013.01); *B32B 2307/7244* (2013.01); *B32B 2307/7265* (2013.01); *B32B 2377/00* (2013.01); *B32B 2405/00* (2013.01); *B32B 2451/00* (2013.01); *B32B 2556/00* (2013.01);

(Continued)

(58) Field of Classification Search
CPC .. B32B 7/06; B32B 7/12; B32B 37/12; B32B 38/0004
See application file for complete search history.

(56) References Cited

U.S. PATENT DOCUMENTS

| | | | |
|---|---|---|---|
| 3,444,732 A * | 5/1969 | McKinley | B29C 65/30 73/150 A |
| 3,639,500 A | 2/1972 | Muny et al. | |

(Continued)

OTHER PUBLICATIONS

CrashbladeKnives, "Ripstop Nylon Patch", Sep. 20, 2015, https://www.youtube.com/watch?v=eaL5LtebRqM, at 1:28 and 1:48 (Year: 2015).*

(Continued)

*Primary Examiner* — George R Koch
*Assistant Examiner* — Christopher C Caillouet
(74) *Attorney, Agent, or Firm* — Dentons Durham Jones Pinegar; Sarah W. Matthews

(57) ABSTRACT

Applique, self-adhesive patches for repairing clothing, inflatable sleeping pads, tents, and other fabric articles, and methods for manufacturing and applying the patches. The patch includes a layer of fabric laminated to a layer of adhesive, the layer of adhesive being thicker than the layer of fabric. The patch is cut by a laser or heat punch, forming an edge portion wherein the backing protecting the adhesive, the adhesive, and the fabric are more closely bonded than the rest of the patch.

15 Claims, 4 Drawing Sheets

(51) Int. Cl.
  *B32B 27/12* (2006.01)
  *B32B 37/10* (2006.01)
  *B32B 37/12* (2006.01)
  *C09J 7/21* (2018.01)
  *B32B 37/20* (2006.01)
(52) U.S. Cl.
  CPC .... *C09J 2301/122* (2020.08); *C09J 2400/263* (2013.01)

(56) References Cited

U.S. PATENT DOCUMENTS

| | | | | |
|---|---|---|---|---|
| 3,826,701 | A * | 7/1974 | Miller | B29C 65/18 |
| | | | | 156/359 |
| 3,925,139 | A * | 12/1975 | Simmons | B29C 65/7453 |
| | | | | 156/358 |
| 5,593,759 | A | 1/1997 | Vargas et al. | |
| 6,418,974 | B1 * | 7/2002 | King | B01D 46/0001 |
| | | | | 139/383 R |
| 7,296,301 | B1 | 11/2007 | Conn | |
| 7,297,400 | B2 | 11/2007 | Yang et al. | |
| 8,765,245 | B2 | 7/2014 | Llano | |
| 2006/0010576 | A1 | 1/2006 | Tse et al. | |
| 2011/0047676 | A1 | 3/2011 | Balducci | |
| 2011/0053450 | A1 | 3/2011 | Baqai et al. | |
| 2012/0023641 | A1 | 2/2012 | Shen et al. | |
| 2013/0340933 | A1 * | 12/2013 | Stover | F41H 1/02 |
| | | | | 156/250 |
| 2014/0021204 | A1 * | 1/2014 | Sinclair | B65D 5/701 |
| | | | | 220/203.01 |
| 2015/0072114 | A1 * | 3/2015 | Llano | B32B 5/024 |
| | | | | 428/196 |
| 2017/0326857 | A1 * | 11/2017 | Weedlun | B32B 38/145 |

OTHER PUBLICATIONS

Well Bond Group, http://www.wellbondgroup.com/e_productshow/?17-Ripstop-nylon-tear-repair-patches-17.html ; published Feb. 1, 2017 (Year: 2017).*

Jones, Kelli. First sale of claimed patches in May 2016.

* cited by examiner

PATCHES FOR OUTDOOR PRODUCTS AND METHOD OF MANUFACTURE

TECHNICAL FIELD

The present invention relates to applique, self-adhesive patches for repairing clothing, inflatable sleeping pads, tents, and other fabric articles, and to methods for manufacturing and applying the patches.

BACKGROUND

It is well-known that patches can be used for repairing tears or cuts in fabrics. In the past, some patches have been stitched or sewn onto an item of apparel. Traditionally, patches used to repair tears or cuts in fabrics have been made from relatively heavy and rigid woven fabrics, especially when the patch must be waterproof.

Outdoors gear such as tents, sleeping bags, inflatable sleeping pads, and clothing, frequently become ripped or torn. Sewing or stitching patches onto an item of backpacking gear or other outdoors gear can be a time-consuming process. In addition, sewing a patch can degrade or otherwise weaken the underlying garment due to, for example, needle holes from the sewing process. Any such weakening can be especially problematic for performance wear, such as rain shells, which must remain waterproof. Stitching is impossible with patches applied to some types of outdoor gear, such as inflatable sleeping pads, which must remain airtight throughout a night's use.

Hikers, campers, hunters, and outdoorspeople therefore frequently turn to self-adhesive patches to repair fabrics. Such patches include an adhesive on one side of the patch, protected by a backing layer. In use, the backing layer is peeled away and the patch can be adhered to the item of apparel using heat or pressure. These patches are useful, but may degrade over time even when they have not yet been applied to gear. Oxygen exposure, for example, may slowly degrade the adhesive. Excessive cold or heat can do the same. High heat and pressure—a common condition inside a backpack carried outdoors during the summer—may cause the backing to adhere firmly to the patch, so that a user cannot peel the backing away when the patch is needed. Conversely in colder weather, unexpected separation of the adhesive and the backing may become a problem: constant jostling may cause the backing layer to separate from the adhesive, which then may become dusty or pick up lint, resulting in poor adherence once the patch is applied to fabric.

Additionally, such patches are typically not themselves waterproof—because waterproof material tends to be slick or have its own coating, these properties can interfere with a good bond between the adhesive and the fabric, especially when exposed to the conditions detailed above. Likewise, commonly-available patches may not be treated to protect them from UV-degradation, as each additional coating interferes with the proper bond between adhesive and fabric.

Self-adhering or sticky-back patches are often made in the same manner as paper stickers—large sheets of fabric are treated with adhesive, a backing is applied to the adhesive, and then the fabric is stamped, punched, or simply cut into suitable sizes. Sometimes, the adhesive patch is supplied to the end user with a separate bottle of additional adhesive, especially when a very tight seal is necessary (such as with patches on inflatable sleeping pads.) These separate bottles may leak, and are easy to lose.

Outdoors gear is increasingly made of lightweight or ultralight materials, such as nylon (sometimes very thinly woven, including weights as light as ten or seven denier, or even less), or types of fabrics originally used in racing sailboat sails such as Kevlar® or Cuben Fiber® (a sandwich of Ultra High Molecular Weight Polyethylene (UHMWPE) fiber monofilaments and polyester, polyvinylidene fluoride (PVF), and other layered films.) Lightweight materials such as these can easily become ripped or abraded, and tend to be difficult to repair with patches due to the materials' thinness, creep under high loads, stretch characteristics, flexibility, response to heat and sunlight, and the like. Self-adhesive patches may tend to peel more easily from lightweight or ultralight materials, reducing the effectiveness of such patches.

Many types of fabric outdoor gear have irregular surfaces, which further reduces the usefulness of self-adhering patches. For example, jackets and sleeping bags may be quilted; tents and backpacks are often crisscrossed with stitched seams. When a self-adhesive patch is placed over such seams or quilting lines, the adhesive may not contact, or adhere well to, the irregular stitch marks of these features.

While self-adhering patches are easy to carry in the event of a rip in the fabric of a piece of outdoor gear, they are not convenient to apply. The ripped article must typically be clean and dry. The patch often must be applied and then adhered with heat—generally applied via a hair blower or by placing the article in a laundry dryer. Both methods require electricity, which may not be convenient to locate in the backcountry, and it can be difficult to fit large articles such as a tent into a consumer-grade laundry dryer. Excessive or uneven heat, applied via either method, can deform or damage very lightweight materials.

Additionally, outdoors gear is often used in difficult environments. Patches applied to such articles must withstand heat, cold, sunlight exposure, dirt and dust, numerous wash and dry cycles, and often a great deal of stretching and bending. One of the results of this challenging environment is that portions of the patch—usually the corners, at first—begin to come loose from the underlying fabric. Once this process begins, dust accumulates between the separated portion of the patch and the fabric, further de-adhering the patch and potentially damaging the fabric even more. The patch eventually may peel away from the fabric so much that it can become caught or snagged on other objects, and may be torn away from the fabric, also causing damage, or may leave gummy or sticky adhesive residue behind.

Because of this tendency to degrade from the outer edges, corners, or points, self-adhering patches are often stamped or cut into circular or rounded shapes. Because such shapes lack corners or points, they may not separate as quickly from the fabric to which they are applied. Only a few self-adhesive patches for outdoor use are formed in fanciful or decorative shapes (e.g. the profiles of butterflies, moustaches, or stars), because of the poor adherence characteristics of such shapes. Users may prefer a decorative shape for its aesthetic value, but can use such patches only for gear that sees very little wear or hard use—staying dry and warm is simply more important in the backcountry.

Accordingly, there is a need in the art for innovative patches and methods of applying and producing patches that are more suitable for active wear apparel and other outdoor gear. It is an advantage if the patch is resistant to degradation as a result of long storage in conditions in heat or cold, even if the patch is jammed into a backpack. It is a further advantage if a patch can be applied in the field, without need for a separate bottle of adhesive or sealant, and without need for a clothes dryer or hairdryer. It is beneficial if the patch can be applied to somewhat dusty fabrics, and is suitable for applying to very thin or ultralight fabrics, or over seams or quilted surfaces. In addition, it is beneficial if the patch can be produced in fanciful or decorative shapes, without compromising its adhesive properties.

SUMMARY

Embodiments of a self-adhesive patch and methods of manufacture are discussed below. The patches and methods include a variety of inventive aspects which can be used together to produce a self-adhering fabric patch that is both decorative and functional under challenging outdoor conditions. It will be appreciated that various aspects of the invention can be used independently or together and that the invention is set forth in the attached claims rather than the description contained herein.

BRIEF DESCRIPTION OF THE DRAWINGS

The following drawings illustrate what are currently considered to be specific representative configurations for carrying out the invention and are not limiting as to embodiments which may be made in accordance with the present invention. The components in the drawings are not necessarily to scale relative to each other. Like reference numerals designate corresponding parts throughout the several views.

The drawings are illustrative and not limiting of the scope of the invention which is defined by the appended claims. The various elements of the invention accomplish various aspects and objects of the invention. Not every element of the invention can be clearly displayed in a single drawing, and as such not every drawing shows each element of the invention.

Figure 1:
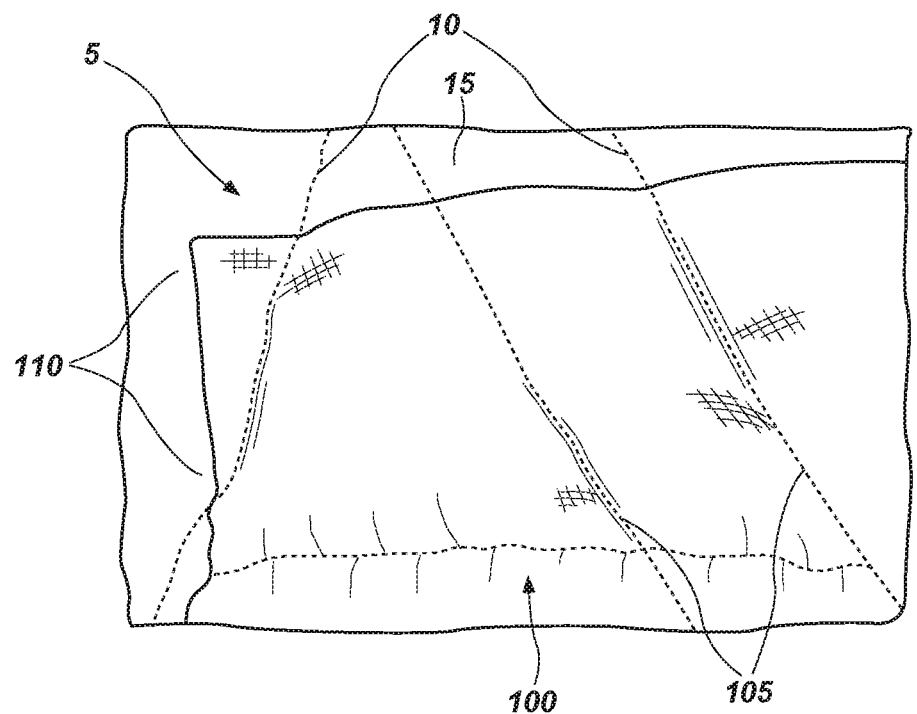

Various embodiments and features of self-adhesive patches are shown and described in reference to the following numbered drawings:

FIG. 1 is a closeup view of a patch made in accordance with the teachings of the present disclosure and applied to a quilted jacket.

Figure 2:
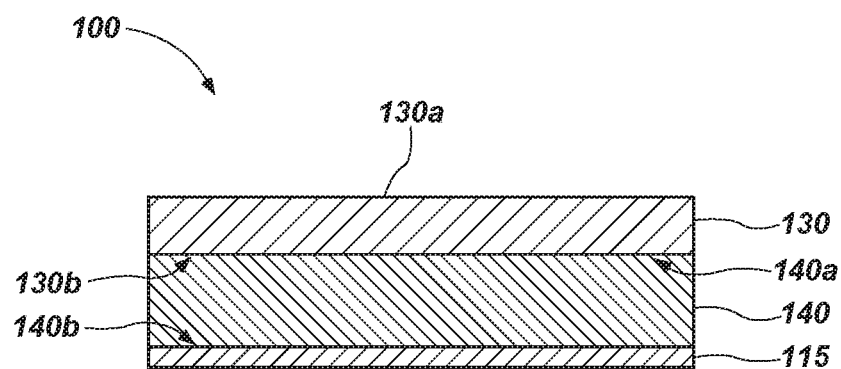

FIG. 2 is a side, cross-sectional view of a patch according to the present disclosure.

Figure 3:
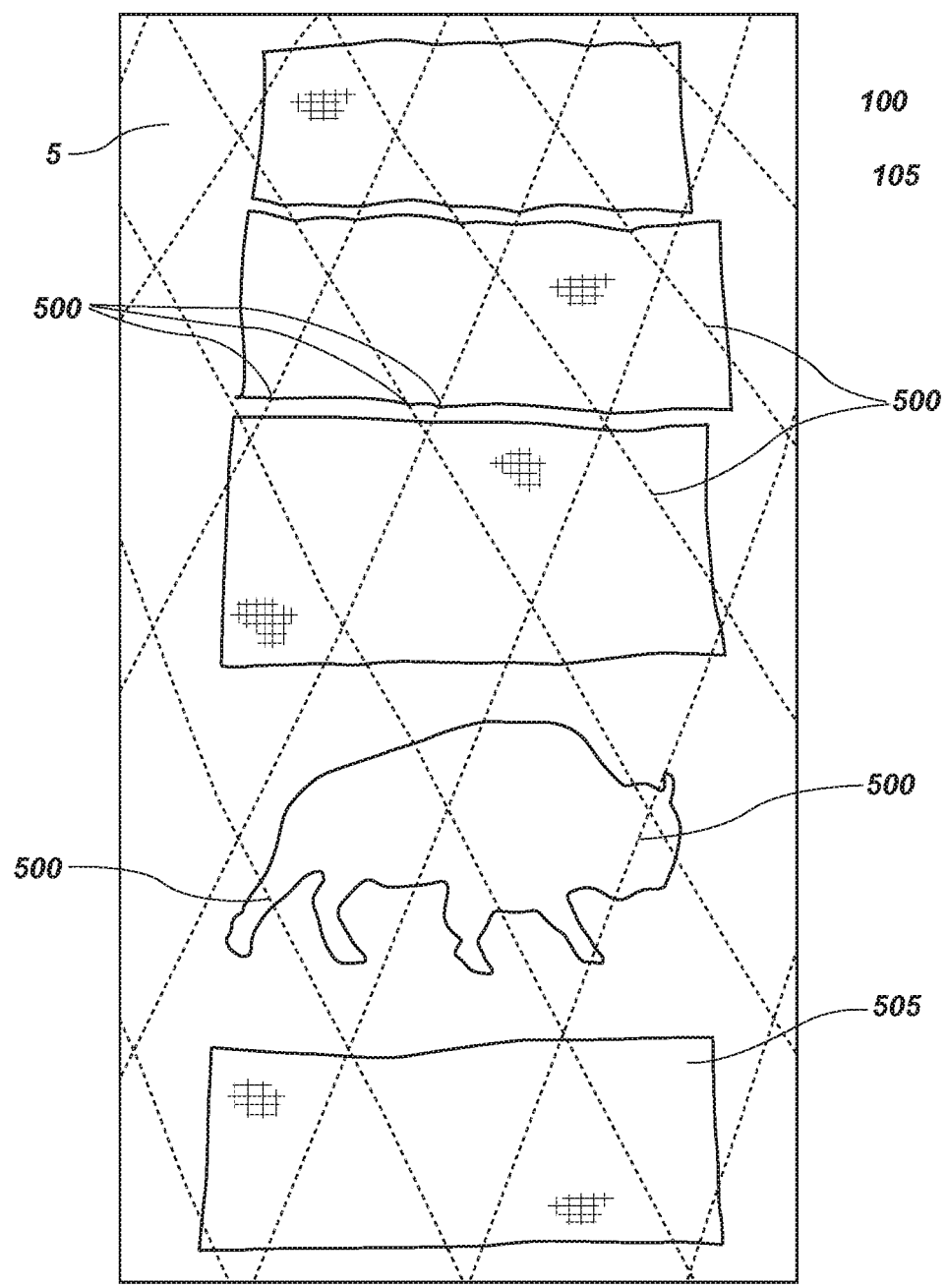

FIG. 3 is a view of a patch made in made in accordance with the teachings of the present disclosure and applied to a quilted jacket, with other types of patches applied to the same jacket below.

Figure 4:
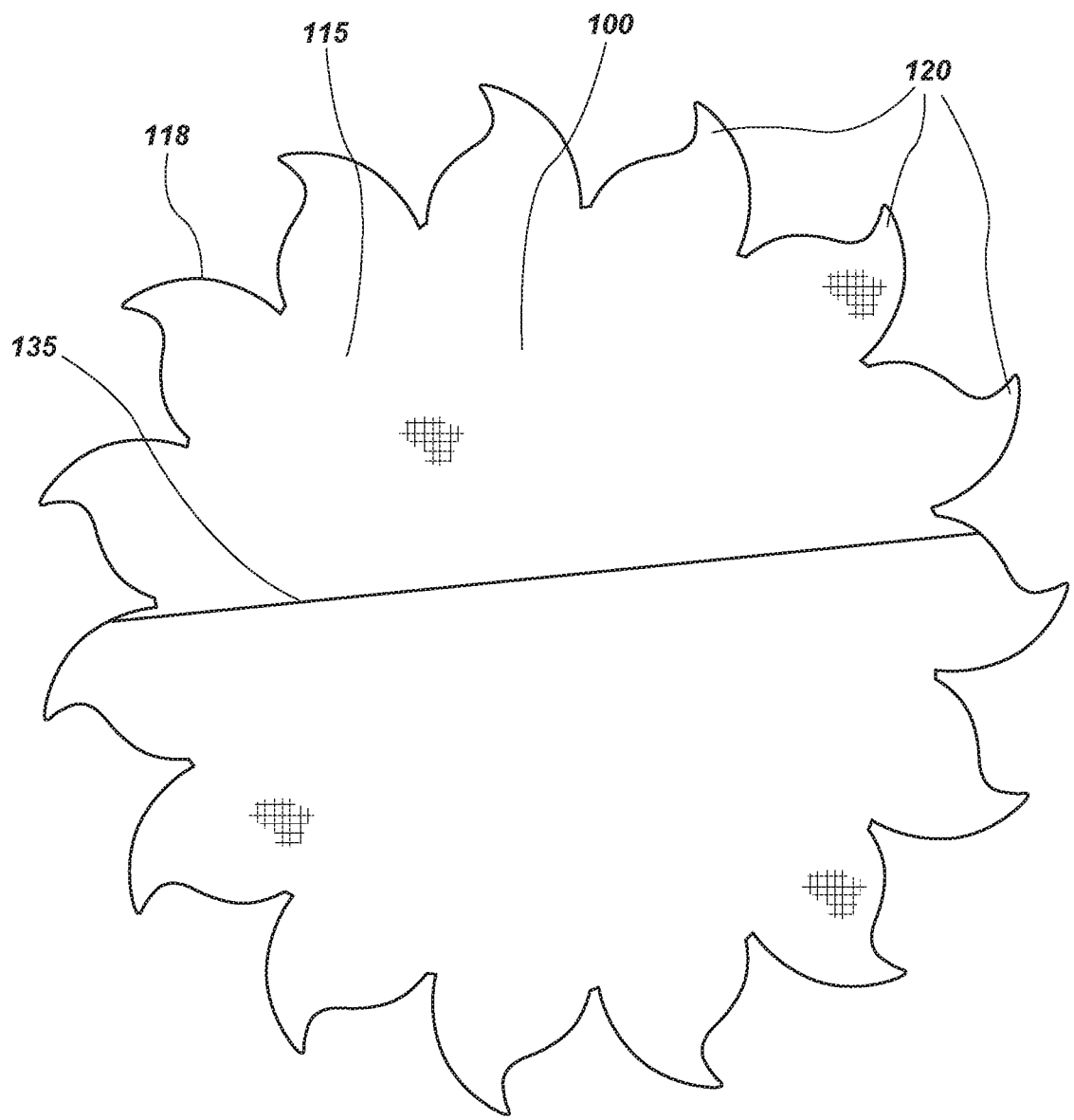

FIG. 4 is a view of the back side of a patch, including a crack-and-peel backing.

Figure 5:
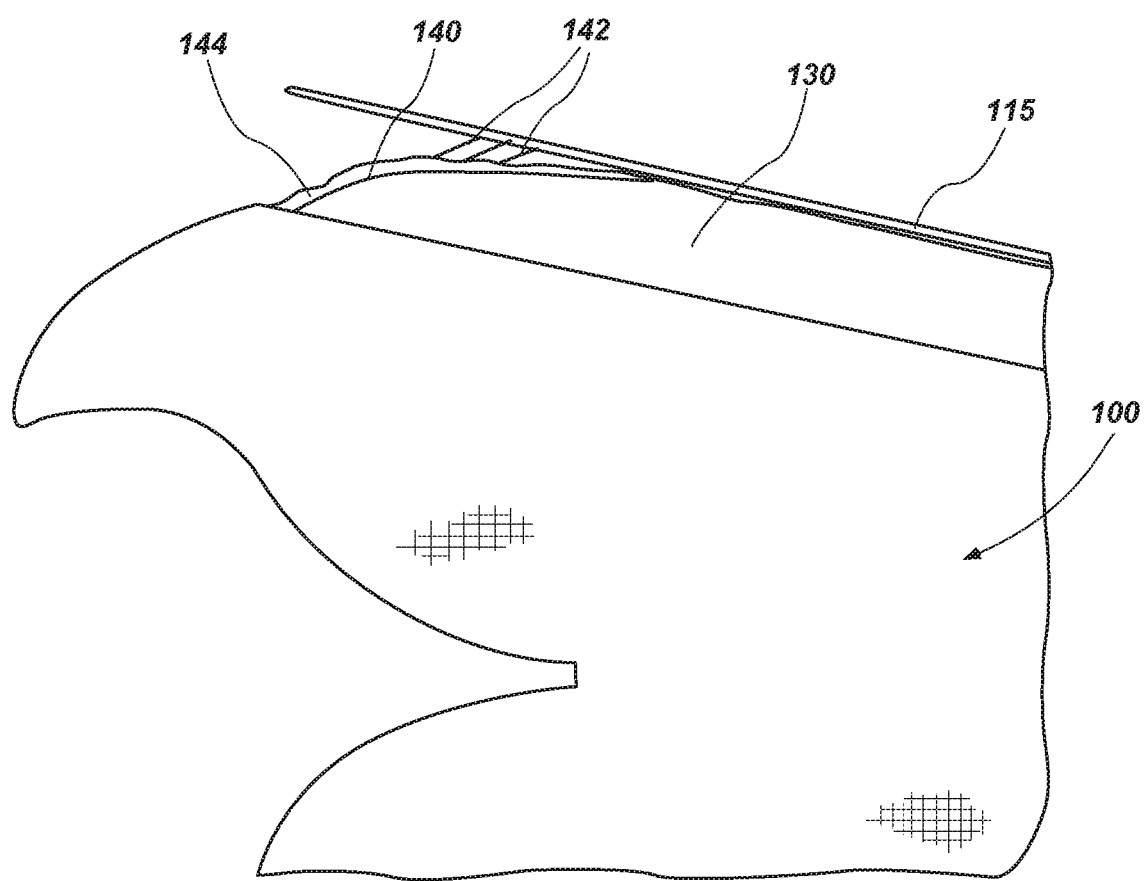

FIG. 5 is a closeup view of a patch made in accordance with the present disclosure, with the backing being slightly peeled away.

It will be appreciated that the drawings are illustrative and not limiting of the scope of the invention which is defined by the appended claims. The embodiments shown accomplish various aspects of the invention. It is appreciated that it is not possible to clearly show each element and aspect of an invention in a single figure, and as such, multiple figures are presented to separately illustrate the various details of embodiments of self-adhesive patches and methods of manufacture in greater clarity. Several aspects from different figures may be used in accordance with patches in a single structure. Similarly, not every embodiment need accomplish all advantages of various embodiments of a self-adhesive patch for outdoor gear.

DETAILED DESCRIPTION

The invention and accompanying drawings will now be discussed in reference to the numerals provided therein so as to enable one skilled in the art to practice the present invention. The skilled artisan will understand, however, that the apparatuses, systems and methods described below can be practiced without employing these specific details, or that they can be used for purposes other than those described herein. Indeed, they can be modified and can be used in conjunction with products and techniques known to those of skill in the art in light of the present disclosure. The drawings and descriptions are intended to be exemplary of various aspects of the invention and are not intended to narrow the scope of the appended claims. Furthermore, it will be appreciated that the drawings may show aspects of the invention in isolation and the elements in one figure may be used in conjunction with elements shown in other figures.

Reference in the specification to "one configuration" "one embodiment," "a configuration" or "an embodiment" means that a particular feature, structure, or characteristic described in connection with the configuration is included in at least one configuration, but is not a requirement that such feature, structure or characteristic be present in any particular configuration unless expressly set forth in the claims as being present. The appearances of the phrase "in one configuration" in various places may not necessarily limit the inclusion of a particular element of the invention to a single configuration, rather the element may be included in other or all configurations discussed herein.

Furthermore, the described features, structures, or characteristics of configurations of the invention may be combined in any suitable manner in one or more configurations. In the following description, numerous specific details are provided, such as examples of products or manufacturing techniques that may be used, to provide a thorough understanding of configurations of the invention. One skilled in the relevant art will recognize, however, that configurations of the invention may be practiced without one or more of the specific details, or with other methods, components, materials, and so forth. In other instances, well-known structures, materials, or operations are not shown or described in detail to avoid obscuring aspects of the invention.

Before the present invention is disclosed and described in detail, it should be understood that the present disclosure is not limited to any particular structures, process steps, or materials discussed or disclosed herein, but is intended to include equivalents thereof as would be recognized by those of ordinarily skill in the relevant art. More specifically, the invention is defined by the terms set forth in the claims. It should also be understood that terminology contained herein is used for the purpose of describing particular aspects of the invention only and is not intended to limit the invention to the aspects or configurations shown unless expressly indicated as such. Likewise, the discussion of any particular aspect of the invention is not to be understood as a requirement that such aspect is required to be present apart from an express inclusion of the aspect in the claims.

It should also be noted that, as used in this specification and the appended claims, singular forms such as "a," "an," and "the" may include the plural unless the context clearly dictates otherwise. Thus, for example, reference to "a shape" may include one or more of such shapes, and reference to "the backing" may include reference to one or more of such layers.

As used herein, the term "substantially" refers to the complete or nearly complete extent or degree of an action, characteristic, property, state, structure, item, or result to function as indicated. For example, an object, such as tubing, that is "substantially" enclosed would mean that the object is either completely enclosed or nearly completely enclosed. The exact allowable degree of deviation from absolute completeness may in some cases depend on the specific context, such that enclosing nearly all of the length of a piece of tubing would be substantially enclosed, even if the distal end of the structure enclosing the tubing had a slit or channel formed along a portion thereof. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it lacked a bottom.

Likewise, the term generally is used to identify a situation in which some is close enough that it would commonly be considered to be a described feature, position, etc., even though it is not exactly so. For example, a structure may be said to be generally cut to right angles even though the angle is not exactly 90 degrees. In other words, an angle of 80 degrees may be said to be generally at right angles. The exact range will be determined by the ordinary usage of a person of ordinary skill in the art.

As used herein, the term "about" is used to provide flexibility to a numerical range endpoint by providing that a given value may be "a little above" or "a little below" the endpoint while still accomplishing the function associated with the range.

As used herein, a plurality of items, structural elements, compositional elements, and/or materials may be presented in a common list for convenience. However, these lists should be construed as though each member of the list is individually identified as a separate and unique member.

Concentrations, amounts, proportions and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation should apply regardless of the breadth of the range or the characteristics being described.

Turning now to FIG. 1, there is shown a jacket or other article of outdoor gear, generally indicated at 5. The jacket 5 includes quilting lines 10, which are stitched depression in between baffles 15. The baffles may be, for example, stuffed with down or with other insulating material, or may be arranged purely for decorative purposes.

Applied to this article 5 is an adhesive patch made in accordance with the present disclosure, generally indicated at 100. A major challenge with adhesive patches is that they do not bond well with quilting or stitch lines 10.

One means of overcoming this limitation is to use a layer of adhesive which may actually be thicker than the fabric of the patch. This results in a patch which forms close-fitting divots 105 where it crosses stitch lines 10. In some embodiments, fabrics may be 30 denier nylon ripstop with UV degradation inhibitors (the fabric being roughly 0.00508 cm (0.002") to 0.01016 cm (0.004") thick) coupled with an adhesive generally around 0.0127 cm (0.005") thick. Adhesive may vary between application methods, but may be for example from 0.00889 cm (0.0035") to 0.02032 cm (0.008") in thickness. In other embodiments, a slightly heavier-duty fabric may be used—especially where a metallic-looking patch is desired—however the higher ratio of fabric to adhesive may result in a patch which does not follow stitch lines 10 with the same fidelity.

As seen in FIG. 2, the fabric 130 has an external side 130*a*. The external side 130*a* is the side that will face the exterior of the jacket, other article of clothing, sleeping bag, etc., when the patch is in place. The internal side of the fabric 130*b* is the side which is laminated to the adhesive layer 140. The adhesive layer is laminated to the fabric on a first side 140*a*, and is covered by a backing 115 on a second side 140*b*.

Thick layers of adhesive may require additional curing time, in order to bond fully with thin fabric layers. One means of producing a patch is to select a roll of fabric, and spread it out across a roll of adhesive with a backing layer. The fabric and adhesive are then laminated together using pressure, and allowed to cure, before cutting individual patches. In some embodiments, the adhesive and fabric are allowed to set for an hour after lamination, to let the adhesive set. The best bond integrity between fabric and adhesive occurs several days after lamination.

One advantage of using a comparatively thick layer of adhesive is that the adhesive layer may form a seep or edge-seal 110 approximately 1/16" wide around the rim of the patch, when the patch is applied to clothing in the presence of sufficient heat.

In some embodiments, once lamination is complete, the patches are then cut using a laser or heat punch, and the back of each patch is scored or kissed along the backing layer, as described in more detail below.

FIG. 3, shows a view of a patch 100 made in made in accordance with the teachings of the present disclosure and applied to a quilted jacket, with other types of patches applied to the same jacket below. The patch 100 forms patch divots 105 where the patch adheres closely to the underlying stitch lines. Additional prior art patches 500, adhered to the same material, do not follow the underlying stitch and seam lines with high fidelity, and frequently form gaps 502 along the edges, where a seam line passes beneath the edge of the prior art patch 500. Prior patches 500 typically have a thick fabric layer and a thin layer of pressure-sensitive adhesive disposed on one side of the fabric; such fabrics are typically at least about 0.03556 centimeters (0.014 inches) thick and the adhesive layers are typically about 0.00762 centimeters (0.003 inches) thick.

In the present washing adherence test, a patch made in accordance with the present disclosure 100 was washed and dried in a household laundry washer and dryer for 50 cycles, alongside other patches 500 and a strip of duct tape 505. The duct tape 505 fell off in the first wash/dry cycle. While the patch made in accordance with the present disclosure remained adhered to the underlying material during the entire test, every other brand of patch began to peel up at the corners or points by the 7$^{th}$ wash/dry cycle. By the 12$^{th}$ to 16$^{th}$ cycle, every other patch had begun to crack, and the peeling corners worsened until the patches could become snagged on other articles of clothing or environmental hazards. The patch made in accordance with the present disclosure 100 remained firmly adhered, without peeling or cracking, for the entire 50-cycle test.

Patches 100 made in accordance with the present disclosure have greatly-increased T-Peel strength from a nylon substrate than typical patches 500, and also increased static shear strength.

Turning now to FIG. 4, there is shown a back of an adhesive patch 100 made in accordance with the present disclosure. The patch is viewed from the backing 115 side, with the fabric hidden by the cut-to-match backing. The backing 115 may be a waxy paper layer. During manufacture of the adhesive patch, after the fabric is allowed to cure with the adhesive and backing, both the fabric and the backing may be laser-cut or heat-punched. Additionally, the backing is scored or kissed 135 across a portion of each patch. Ideally, the scoring 130 does not cut through the full thickness of the backing.

Thus, when a user wishes to apply the patch, he or she can fold the patch along the line of the score 135. This ruptures the backing, allowing the backing to be peeled cleanly away from the patch. However, while in storage (for example, while the patch is still in its packaging), the score line 135 remains unruptured. Thus, very little oxygen or humidity penetrates the backing, resulting in adhesive which does not age or degrade as quickly during storage.

The scored back 135 also aids users in precisely-positioning the patch, before it is adhered to a surface. The backing may be partly peeled away from either side of the score line 135, and the user may adhere the center portion of the patch to the article needing repair first, and then finish peeling away the backing and adhering the sides. This reduces the chance that a user will inadvertently touch the adhesive layer, which may leave finger oils or dust and interfere with the bonding. After adhering the patch, the user may apply heat to seal the patch. According to one aspect, heat of around 26.6 degrees Celsius (around 80 degrees Fahrenheit) is sufficient to heat seal the patch to a fabric. According to another aspect, a user may apply heat to the patch by placing the fabric with the patch into a dryer. In this configuration, heat of less than around 65.5 degrees Celsius (150 degrees Fahrenheit) may be used to seal the patch to the fabric. In other configurations, heat of less than around 51.6 degrees Celsius to around 57.2 degrees Celsius (125 degrees to 135 degrees Fahrenheit) may be used to seal the patch to the fabric.

An additional location where oxygen or moisture infiltration is a concern on most adhesive patches is the edge 118, particularly when the patch is cut into shapes having points 120 or other fanciful designs. However, as described above, patches 100 made in accordance with the present disclosure may be, for example, laser-cut or heat-punched. The result of this specialized cut is that the edges 118 of each patch shape have a region in which the backing, the adhesive, and the fabric are bonded together more tightly than the rest of the patch. Thus, air, moisture, and oxygen do not penetrate the patch edges 118 as much while the patch is in storage.

Turning now to FIG. 5, there is shown a closeup view of a backing 115 being slowly peeled away from a patch, indicated generally at 100, made in accordance with the present disclosure. The fabric 130 of the patch can be seen through the thicker layer of adhesive 140. As a result of the method of manufacture herein disclosed, small strings or threads or ropes 142 of adhesive may stretch between the backing 115 and the adhesive layer 140 bonded to the fabric 130 as the backing is carefully peeled away from the fabric. In some embodiments, depending on the relative thickness of fabric and adhesive, the adhesive may form a rim or cusp 144 all along the edge of the patch, as the backing 115 is peeled carefully away.

In addition, it will be appreciated that the fabric may be dyed via several different methods, including silk screening and dye sublimation. Silk screening is not often used to decorate adhesive patches, as the textile ink used may introduce trace moisture or create coatings on the fabric, which could interfere with the bond between fabric and adhesive. Dye sublimation tends to be suitable for polyester patches only, because nylon may melt at the temperatures employed to transfer the printed image from the paper to the sublimation-ready surface.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

Thus, there is disclosed a self-adhesive patch and methods of manufacture. It will be appreciated that numerous changes may be made to the above-disclosed embodiments of patches and associated methods without departing from the scope of the claims. The appended claims are intended to cover such modifications.

What is claimed is:

1. A method of manufacturing an adhesive patch, the method comprising:
   providing a fabric having a first thickness of from 0.002 inches to 0.004 inches, wherein the fabric comprises denier nylon ripstop;
   laminating a sheet of adhesive having a backing to the fabric, the sheet of adhesive having a second thickness of 0.004-0.008 inches, wherein the second thickness is greater than the first thickness;
   cutting a score on the backing;
   after the sheet of adhesive is laminated to the fabric, heat-cutting a shape through the fabric, the sheet of adhesive, and the backing.

2. The method of manufacturing an adhesive patch of claim 1, wherein the step of heat-cutting further comprises: using a laser to heat cut through the fabric, the sheet of adhesive, and the backing at the same time.

3. The method of manufacturing an adhesive patch of claim 1, wherein the step of heat-cutting further comprises: using pressure.

4. The method of manufacturing an adhesive patch of claim 1, wherein the fabric has a thickness, the thickness being 0.003 inches.

5. The method of manufacturing an adhesive patch of claim 1, wherein the backing comprises an adhesive side and an exposed side, and wherein the step of cutting a score on the backing comprises cutting a score from the exposed side.

6. The method of manufacturing an adhesive patch of claim 5, wherein the score does not pass through to the adhesive side of the backing.

7. The method of manufacturing an adhesive patch of claim 1, wherein the step of laminating the sheet of adhesive having the backing to the fabric forms a fabric-adhesive lamination, and further comprising the step of: curing the fabric-adhesive lamination for at least three hours.

8. The method of manufacturing an adhesive patch of claim 1, wherein the sheet of adhesive forms a seep seal around an outer edge of the adhesive patch when the adhesive patch is applied to a second fabric.

9. The method of manufacturing the adhesive patch of claim 8, wherein the seep seal is 1/16 inches wide on the second fabric around the outer edge of the adhesive patch.

10. The method of manufacturing an adhesive patch of claim 1, wherein the step of heat-cutting further comprises: using a laser to heat cut through the fabric, the sheet of adhesive, and the backing at the same time, to form a region around an outer edge of the adhesive patch where the fabric, the sheet of adhesive, and the backing are bonded together more tightly than a remainder of the adhesive patch not in the region around the outer edge of the adhesive patch.

11. A method of manufacturing an adhesive patch, comprising the steps of:
providing a denier nylon ripstop fabric having a thickness of 0.003 inches;
laminating a sheet of adhesive having a backing to the denier nylon ripstop fabric to create a fabric-adhesive lamination, the sheet of adhesive having a adhesive-layer thickness, the adhesive-layer thickness being between 0.0035 inches and 0.008 inches, the adhesive-layer thickness being greater than the first thickness, such that the adhesive can form a seep seal around an outer edge of the denier nylon ripstop fabric when applied to a substrate;
cutting a score on the backing; and
after the sheet of adhesive is laminated to the fabric, using a laser to heat-cut a shape through the fabric-adhesive lamination, the laser further bonding the fabric-adhesive lamination and the backing along an outer edge thereof to form a region around the outer edge of the adhesive patch where the denier nylon ripstop fabric, the sheet of adhesive, and the backing are bonded together more tightly than a remainder of the patch not in the region around the outer edge of the adhesive patch to protect the outer edge of the patch from damage before use of the patch.

12. The method of manufacturing an adhesive patch of claim 11, wherein the sheet of adhesive has an adhesive-layer thickness, the adhesive-layer thickness being between 0.004 inches and 0.006 inches.

13. The method of manufacturing an adhesive patch of claim 11, wherein the backing comprises an adhesive side and an exposed side, and wherein the step of cutting a score on the backing comprises cutting a score from the exposed side of the backing.

14. The method of manufacturing an adhesive patch of claim 13, wherein the score does not pass through to the adhesive side of the backing.

15. A method of manufacturing an adhesive patch, comprising the following steps taken in the following order:
providing a denier nylon ripstop fabric having a thickness of 0.003 inches;
laminating a sheet of adhesive having a backing to the denier nylon ripstop fabric, the sheet of adhesive having a second thickness of 0.0035 inches to 0.008 inches, wherein the second thickness is greater than the first thickness;
using a laser to heat-cut a shape having an outer edge through each of the denier nylon ripstop fabric, the sheet of adhesive, and the backing to form a region around the outer edge of the adhesive patch where the denier nylon ripstop fabric, the sheet of adhesive, and the backing are bonded together more tightly than a remainder of the patch not in the region around the outer edge of the adhesive patch.

\* \* \* \* \*